United States Patent
Seo

(10) Patent No.: US 11,125,283 B2
(45) Date of Patent: Sep. 21, 2021

(54) METHOD OF ADJUSTMENT OF CLUTCH CHARACTERISTIC CURVE

(71) Applicant: Vitesco Technologies GmbH, Hannover (DE)

(72) Inventor: HyeonDeok Seo, Seoul (KR)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/609,550

(22) PCT Filed: May 8, 2018

(86) PCT No.: PCT/EP2018/061869
§ 371 (c)(1),
(2) Date: Oct. 30, 2019

(87) PCT Pub. No.: WO2018/206576
PCT Pub. Date: Nov. 15, 2018

(65) Prior Publication Data
US 2020/0063808 A1    Feb. 27, 2020

(30) Foreign Application Priority Data

May 11, 2017    (KR) .................. 10-2017-0058809

(51) Int. Cl.
*F16D 48/06*    (2006.01)

(52) U.S. Cl.
CPC ........ *F16D 48/06* (2013.01); *F16D 2500/304* (2013.01); *F16D 2500/3026* (2013.01);
(Continued)

(58) Field of Classification Search
CPC ............. F16D 48/06; F16D 2500/3026; F16D 2500/3027; F16D 2500/304;
(Continued)

(56) References Cited

U.S. PATENT DOCUMENTS 8,442,734 B2    5/2013    Desfriches et al.
8,712,658 B2    4/2014    Holzer et al.
(Continued)

FOREIGN PATENT DOCUMENTS

CN    101689847 A    3/2010
CN    102859224 A    1/2013
(Continued)

OTHER PUBLICATIONS

Chinese Office Action for Chinese Application No. 201880030555.7, dated Jun. 17, 2020, with translation, 9 pages.
(Continued)

*Primary Examiner* — Tinh Dang
(74) *Attorney, Agent, or Firm* — RatnerPrestia

(57) ABSTRACT

A method for adjusting a clutch characteristic curve, including obtaining a torque-stroke learning value for adjusting the clutch characteristic curve, calculating a convergence value for each control point of the clutch characteristic curve, calculating a difference value between the convergence value and a characteristic curve value for each control point, and determining a new characteristic curve value of each control point according to whether a maximum value of the calculated difference values exceeds a preset reference value.

4 Claims, 6 Drawing Sheets

(52) U.S. Cl.
CPC ........... *F16D 2500/3027* (2013.01); *F16D 2500/50236* (2013.01); *F16D 2500/70605* (2013.01)

(58) Field of Classification Search
CPC . F16D 2500/50236; F16D 2500/70605; F16D 2500/30421; F16D 2500/5012; F16D 2500/70235; F16D 2500/70252; F16D 2500/70689
See application file for complete search history.

(56) References Cited

U.S. PATENT DOCUMENTS

| | | | |
|---|---|---|---|
| 8,718,888 B2 | 5/2014 | Reibold | |
| 9,377,062 B2* | 6/2016 | Lee | F16D 48/06 |
| 10,619,683 B2* | 4/2020 | Kim | F16H 59/24 |
| 2012/0322618 A1 | 12/2012 | Reibold | |
| 2015/0167756 A1* | 6/2015 | Yoon | F16D 48/06 |
| | | | 701/68 |
| 2015/0167759 A1* | 6/2015 | Lee | F16D 48/06 |
| | | | 701/68 |
| 2015/0308522 A1 | 10/2015 | Cho et al. | |
| 2016/0123411 A1* | 5/2016 | Cho | F16H 63/46 |
| | | | 477/176 |
| 2017/0108062 A1 | 4/2017 | Park | |
| 2017/0166201 A1* | 6/2017 | Kim | B60K 6/48 |
| 2018/0172091 A1* | 6/2018 | Kim | F16D 48/06 |

FOREIGN PATENT DOCUMENTS

| | | |
|---|---|---|
| DE | 102014218895 A1 | 4/2015 |
| EP | 1496281 A1 | 1/2005 |
| EP | 2009313 B1 | 10/2012 |
| EP | 2840276 B1 | 2/2015 |
| KR | 20100007783 A | 1/2010 |
| KR | 101543994 B1 | 8/2015 |

OTHER PUBLICATIONS

International Search Report and Written Opinion for International Application No. PCT/EP2018/061869, dated Aug. 29, 2018, 10 pages.

* cited by examiner

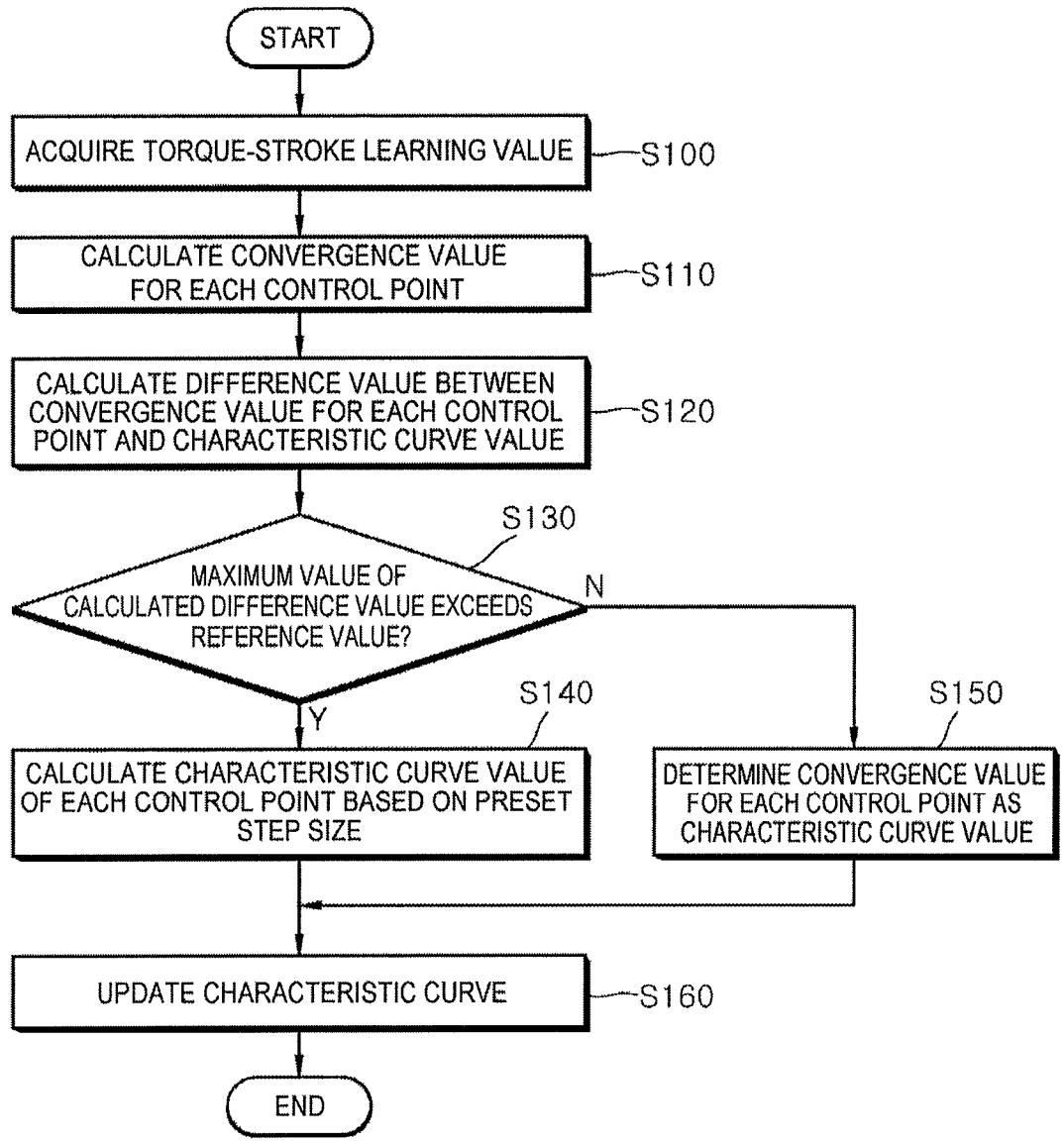

METHOD OF ADJUSTMENT OF CLUTCH CHARACTERISTIC CURVE

CROSS REFERENCE TO RELATED APPLICATIONS

This application is the U.S. National Phase Application of PCT International Application No. PCT/EP2018/061869, filed May 8, 2018, which claims priority to Korean Patent Application No. 10 2017 0058809, filed May 11, 2017, the contents of such applications being incorporated by reference herein.

FIELD OF INVENTION

The present invention relates to a method for adjusting a clutch characteristic curve, and more particularly, to a method for adjusting a clutch characteristic curve through learning,

BACKGROUND OF INVENTION

Generally, a clutch used in a vehicle is controlled by an actuator. The control of such an actuator is performed based on a predetermined characteristic curve. In general, the actuator is controlled by a T-S curve showing the relationship between the torque of the clutch and the stroke of the actuator.

Such a clutch changes its torque characteristics according to a number of factors such as wear tolerance due to individual component tolerances and durability of components, thermal deformation due to high temperature, and change in friction coefficient of the disc.

However, when the actuator is controlled in the state in which the characteristic change is not properly reflected during the control of the clutch, excessive slip occurs, or an impact is caused, there is a need for a technique for precisely grasping the characteristics of the clutch according to the actuator stroke so as to be used for control of the actuator.

Therefore, a control manner is used, which corrects the T-S curve by learning and reflect the current state of the clutch.

The background art of the present invention is disclosed in Korean Patent Publication No. 10-2010-0007783 (published on Jan. 22, 2010), incorporated herein by reference.

SUMMARY OF THE INVENTION

An aspect of the present invention is a method for adjusting a clutch characteristic curve, which suppresses a transient response by limiting a rate of change when a clutch characteristic curve changes.

A method for adjusting a clutch characteristic curve according to an aspect of the present invention is characterized by including steps of: obtaining a torque-stroke learning value for adjusting the clutch characteristic curve; calculating a convergence value for each control point of the clutch characteristic curve; calculating a difference value between the convergence value and a characteristic curve value for each control point; and determining a new characteristic curve value of each control point according to whether a maximum value of the calculated difference values exceeds a preset reference value.

In an aspect of the present invention, the step of determining the new characteristic curve for each control point may include a step of calculating the new characteristic curve value for each control point based on a preset step size when the maximum value of the calculated difference values exceeds the preset reference value.

In an aspect of the present invention, the step of calculating the new characteristic curve value for each control point may include a step of calculating a new characteristic curve value based on a value obtained by multiplying the step size by a ratio of the change value of the corresponding control point to the change value of the control point at which the difference value is the maximum value, for each control point.

In an aspect of the present invention, the step of calculating the new characteristic curve value for each control point may include a step of calculating a new characteristic curve value by using the following Equation 1.

In an aspect of the present invention, the step of determining the new characteristic curve for each control point may include a step of determining a convergence value for each control point as a new characteristic curve value when the maximum value of the calculated difference values does not exceed the preset reference value.

The method for adjusting the clutch characteristic curve may further include, after the step of determining the new characteristic curve for each control point, a step of updating the clutch characteristic curve based on the new characteristic curve value of each control point.

The method for adjusting the clutch characteristic curve according to an aspect of the present invention may suppress the excessive response change in the clutch control by converging the characteristic curve to the final value while maintaining the overall shape of the curve to the maximum value in the process of varying the clutch characteristic curve.

BRIEF DESCRIPTION OF THE DRAWINGS

FIG. 2 is a flowchart for explaining a method for adjusting the clutch characteristic curve according to an embodiment of the present invention.

DETAILED DESCRIPTION OF THE PREFERRED EMBODIMENTS

Figure 1:
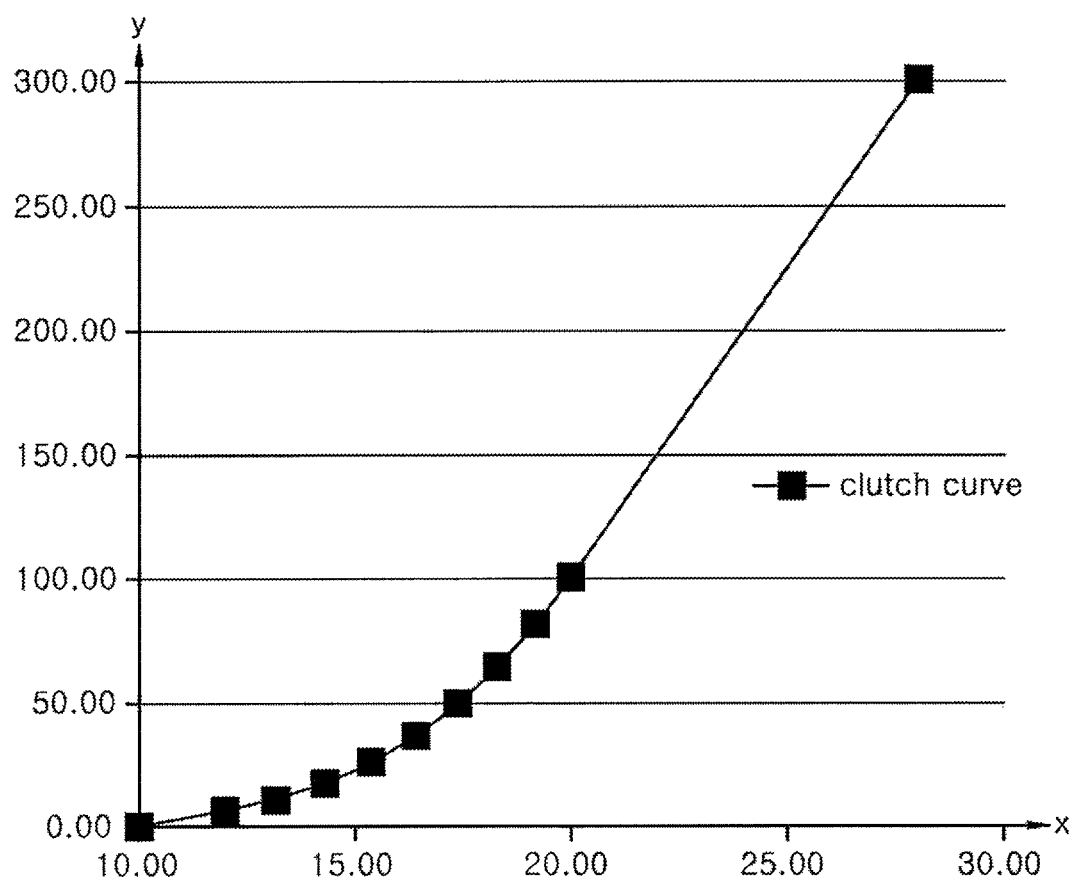
FIG. 1 is a view illustrating an example of a clutch characteristic curve according to an embodiment of the present invention.

Hereinafter, an embodiment of a method for adjusting a clutch characteristic curve according to an aspect of present invention will be described with reference to the accompanying drawings. In the description, the thickness of lines or the size of components shown in the drawings may be exaggerated for the clarity and convenience of the description. In addition, the following terms are defined in consideration of functions in an aspect of the present invention, and the definitions thereof may vary depending on the intention or practice of users or operators. Thus, definitions of the terms should be made based on the contents throughout this specification.

Figure 3A:
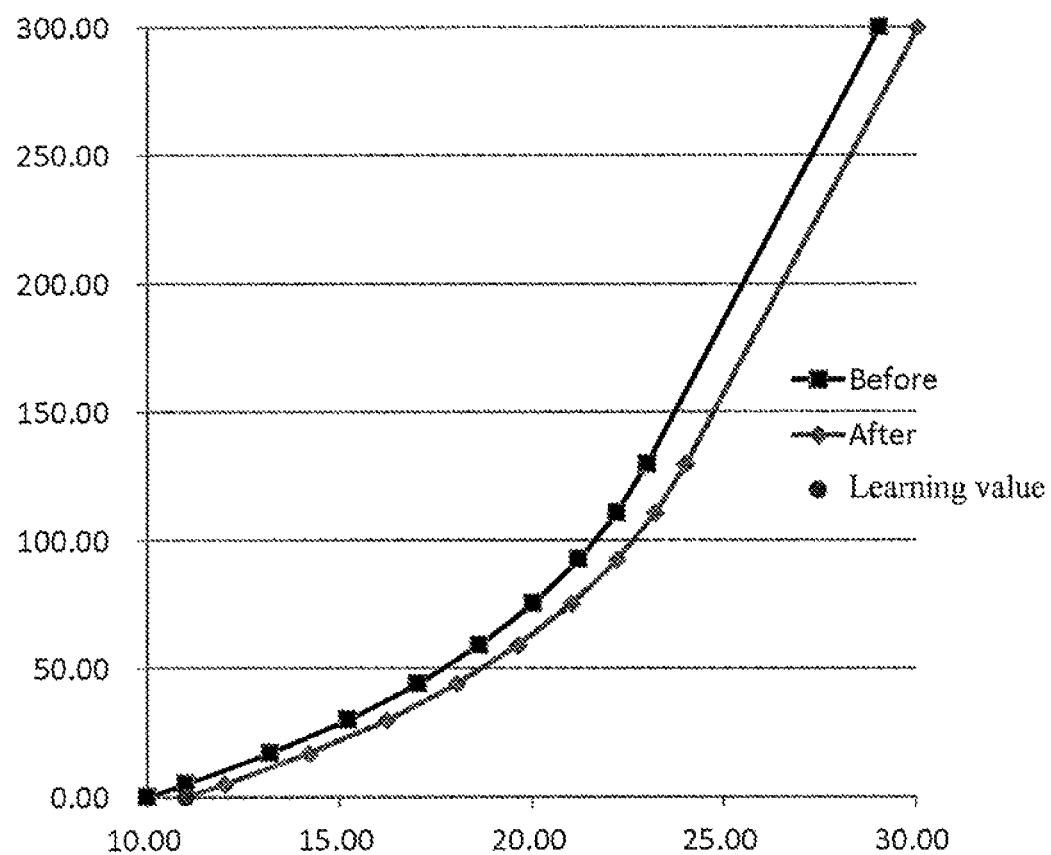
FIG. 3 is a view illustrating an example for explaining a learning value and a convergence value in the method for adjusting the clutch characteristic curve according to an embodiment of the present invention.
Figure 3B:
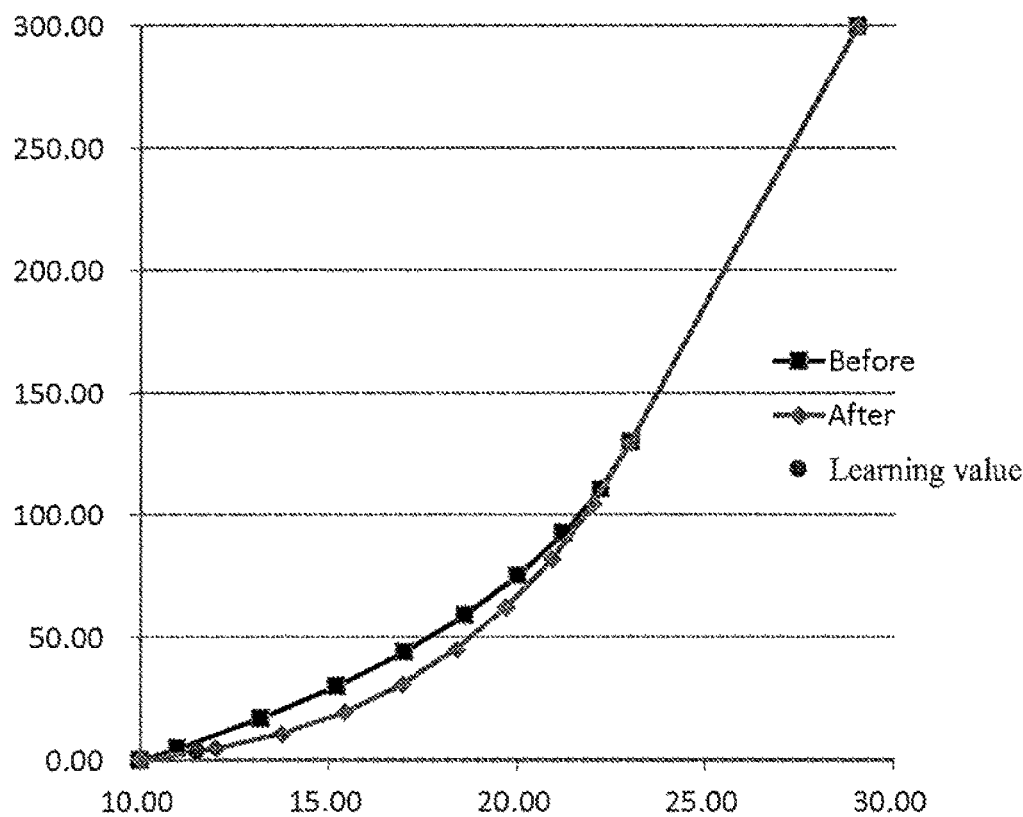
Figure 3C:
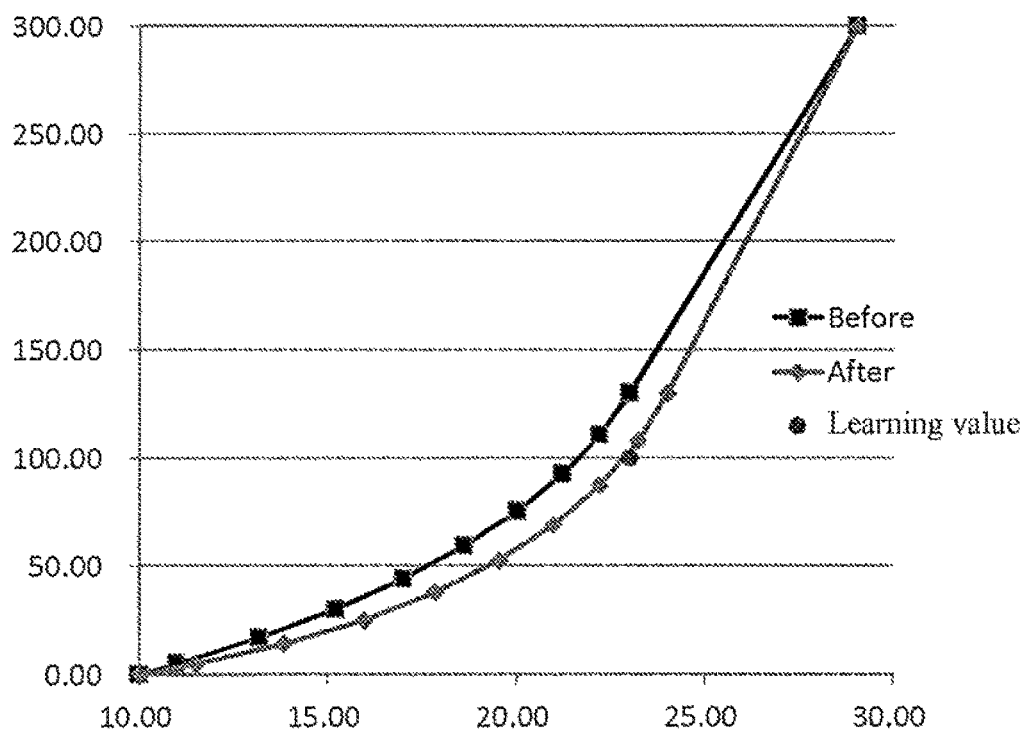
Figure 4A:
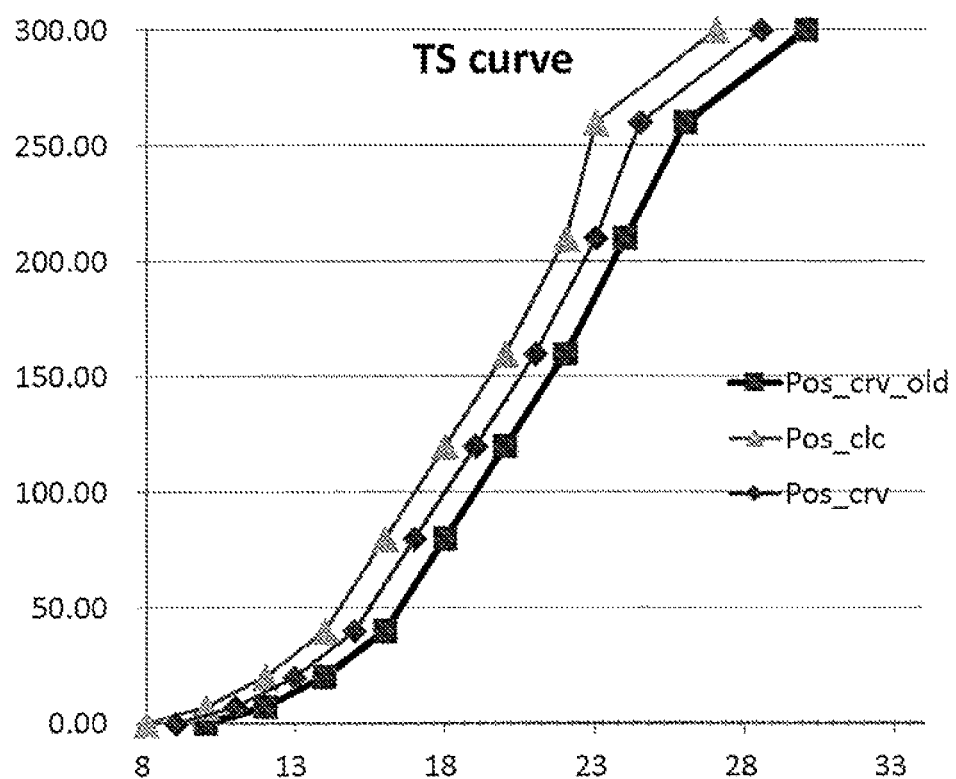
FIG. 4 is a view for explaining a clutch characteristic curve updating manner in the method for adjusting the clutch characteristic curve according to an embodiment of the present invention.
Figure 4B:
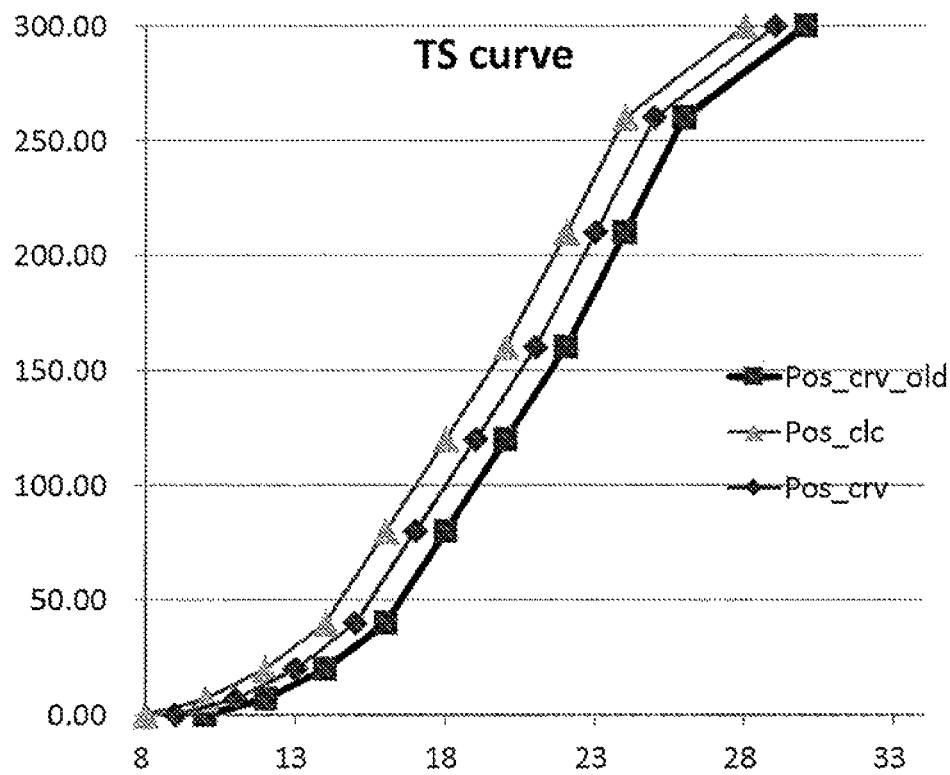
Figure 4C:
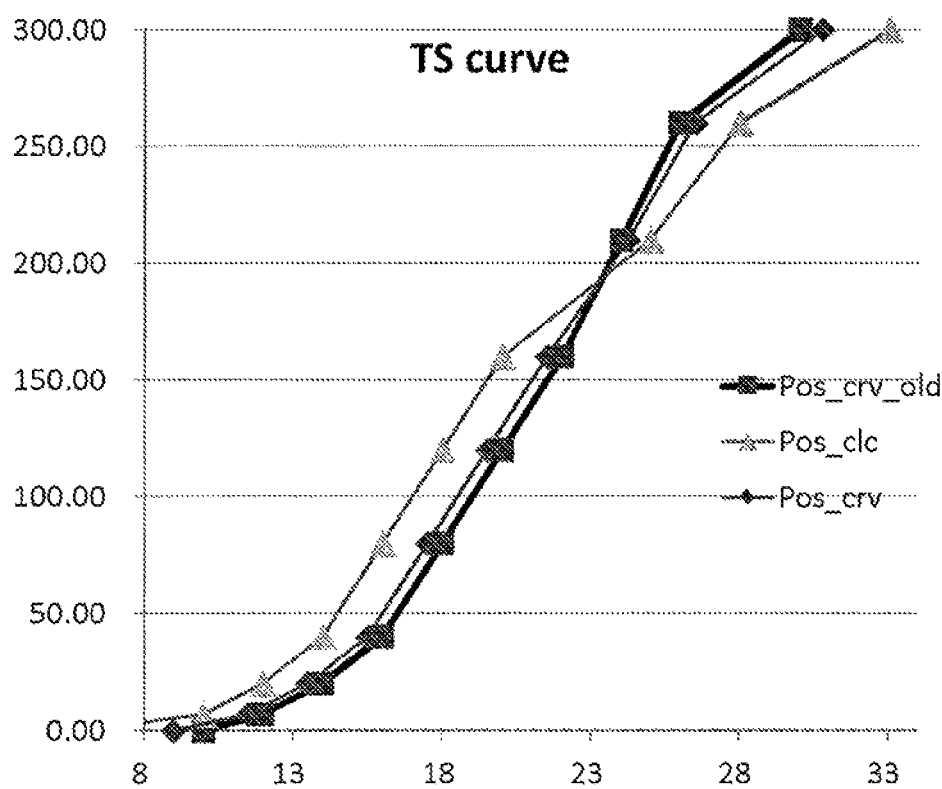

FIG. 1 is a view illustrating an example of a clutch characteristic curve according to an embodiment of the present invention, FIG. 2 is a flowchart for explaining a method for adjusting the clutch characteristic curve according to an embodiment of the present invention, FIG. 3 is a view illustrating an example for explaining a learning value and a convergence value in the method for adjusting the clutch characteristic curve according to an embodiment of the present invention, and FIG. 4 is a view for explaining a clutch characteristic curve updating manner in the method for adjusting the clutch characteristic curve according to an embodiment of the present invention. The method for adjusting the clutch characteristic curve according to an embodiment of the present invention will be described as follows with reference to the drawings.

As illustrated in FIG. 1, in an embodiment of the present invention, the clutch characteristic curve may be a T-S curve (a torque-stroke curve). Here, an X axis represents stroke, and a Y axis represents torque.

The control of the clutch is performed by using the T-S curve. For example, the control of the clutch may be performed in such a manner in which target stroke corresponding to target torque is determined according to the T-S curve. However, a method of controlling the clutch using the T-S curve corresponds to the well-known technique, and thus a detailed description thereof will be omitted in the present invention.

On the other hand, the method for adjusting the clutch characteristic curve according to this embodiment may be performed by a configuration such as an ECU (electronic control unit), a processor, or the like, which may be referred to as a control unit.

A control flow in the method for adjusting the clutch characteristic curve according to the embodiment of the present invention will be described in detail with reference to FIG. 2.

As illustrated in FIG. 2, a step (S100) of obtaining a torque-stroke learning value and a step (S110) of calculating a convergence value for each control point are performed.

In the case of the T-S curve learning which is generally used, learning is not performed for all the points of the curve but only for preset specific points.

For example, in the case of the T-S curve of FIG. 1, the learning is performed at eleven points. Here, a manner of changing the stroke value based on the torque value and a manner of changing the torque value based on the stroke value may be used, but it is commonly used for the manner of changing the stroke value based on the torque value. In addition, the learning may be performed on all the eleven points, but it is possible to perform the learning only on specific points among the eleven points. In an aspect of the present invention, a point at which the learning is performed will be referred to as a control point.

As illustrated in FIG. 3, since the torque-stroke learning value is obtained according to an actual control of the clutch and is not obtained for a preset control point, it is necessary to calculate the point at which each control point moves through the learning value.

For example, a manner of adjusting the T-S curve and moving the control point so that the learning value is located on a new T-S cover, or the like, may be used.

However, since various methods have already been proposed for moving the control point according to the learning value to be obtained, a detailed description thereof will be omitted in the present invention. For example, a high torque area and a low torque area are distinguished from each other, and various methods such as a method for performing spline interpolation for the entire area may be used.

In an aspect of the present invention, the point at which the control point should move according to the learned value to be obtained is referred to as a convergence value.

Referring again to FIG. 2, after the step (S110), a step (S120) of calculating a difference between value between the convergence value and the characteristic curve value for each control point is performed.

That is, when the control point is unconditionally moved according to the learning value obtained as described above, if the learning value, which is regarded as a singular value, is obtained, an error may occur in the TS curve, and distortion may occur in the shape of the TS curve, and thus, the driver may feel the control heterogeneity.

Thus, in this embodiment, the difference value between the convergence value and the characteristic curve value for each control point is calculated so that the rate of change when the clutch characteristic curve changes is limited to suppress the transient response.

Then, when the maximum value among the calculated difference values exceeds the reference value (S130), a step (S140) of calculating a new characteristic curve value of each control point based on the preset step size is performed.

That is, when there is a point where the difference value between the convergence value and the characteristic curve value exceeds a preset reference value, it is possible to suppress the excessive change in the characteristic curve by calculating a new characteristic curve value for each control point based on the preset step size.

In more detail, the new characteristic curve value may be calculated on the basis of a value obtained by multiplying the step size by the ratio of the change value of the corresponding control point to the change value of the control point having the maximum difference value between the convergence value and the characteristic curve value for each control point. Here, the change value means a value obtained by subtracting the characteristic curve value from the convergence value.

That is, each of the control points may move at a ratio corresponding to the change of the control point having the maximum difference value between the convergence value and the characteristic curve value, it is possible to adjust the value while maintaining the existing shape of the characteristic curve as much as possible.

Here, a new characteristic curve value may be calculated using the following Equation (1).

$$Pos_{crv}[k]=\min(\max(A, B), \max(Pos_{crv/old}[k], Pos_{dc}[k])) \quad \text{[Equation 1]}$$

$$A=\min(Pos_{crv/old}[k], Pos_{dc}[k])$$

$$B=Pos_{crv/old}[k]+Wgt_{ftr/step}[k] \times Pos_{ftr/step}$$

$$Wgt_{ftr/step}[k]=\Delta Pos_{ftr}[k] \div \Delta Pos_{ftr/max}$$

(where, $Pos_{crv}[k]$ is a new characteristic curve value of the k-th control point, $Pos_{crv/old}[k]$ is a characteristic curve value of the k-th control point, $Pos_{cic}[k]$ is a convergence value of the k-th control point, $Pos_{ftr/step}$ represents a step size, $\Delta Pos_{ftr}[k]$ is a change value of the k-th control point, and $\Delta Pos_{ftr/max}$ is a change value of the control point in which a difference value between the convergence value and the characteristic curve value is the maximum value)

In the steps (S130) and (S140), the reference value and the step size may be set to various values according to the vehicle specification, the clutch specification, the user's design intention, and the like.

The calculation of the conventional characteristic curve value, the convergence value, and the new characteristic curve value may be performed as illustrated in FIG. 4, and the shape of the characteristic curve may be maintained to the maximum as illustrated in FIG. 4

When the maximum value of the difference values calculated in step (S130) does not exceed the reference value, a convergence value for each control point is determined as a new characteristic curve value (S150).

That is, the convergence value may be used as a new characteristic curve value when it is determined that the change is not large even if the control point is moved to the convergence value.

After the step (S140) or (S150), a step (S160) of updating the characteristic curve using the new characteristic curve value is performed. That is, when a new characteristic curve value of each control point is determined, the clutch characteristic curve may be updated based on the new characteristic curve value of each control point. For example, a spline interpolation may be performed to update the characteristic curve.

However, the method of updating the characteristic curve is not limited thereto, various interpolation methods and the like may be adopted, and a modification that constitutes the system using only the characteristic curve values for each control point is possible instead of updating the characteristic curve itself.

As described above, the method for adjusting the clutch characteristic curve according to an embodiment of the present invention may suppress the excessive response change in the clutch control by converging the characteristic curve to the final value while maintaining the overall shape of the curve to the maximum value in the process of varying the clutch characteristic curve.

Although aspects of the present invention has been described with reference to the embodiments shown in the drawings, this is merely exemplary. It will be understood by those of ordinary skill in the art that various modifications and equivalent embodiments may be made thereto. Therefore, the technical protection scope of the present invention should be determined by the following claims.

The invention claimed is:

1. A method for adjusting a clutch characteristic curve, comprising:
    obtaining a torque-stroke learning value for adjusting the clutch characteristic curve;
    calculating a convergence value for each control point of the clutch characteristic curve;
    calculating a difference value between the convergence value and a characteristic curve value for each control point; and
    determining a new characteristic curve value of each control point according to whether a maximum value of the calculated difference values exceeds a preset reference value,
    wherein the determining the new characteristic curve for each control point comprises calculating the new characteristic curve value for each control point based on a preset step size when the maximum value of the calculated difference values exceeds the preset reference value, and
    wherein the calculating the new characteristic curve value for each control point comprises calculating a new characteristic curve value based on a value obtained by multiplying the step size by a ratio of the change value of the corresponding control point to the change value of the control point at which the difference value is the maximum value, for each control point.

2. The method for adjusting the clutch characteristic curve of claim 1, wherein
    the calculating the new characteristic curve value for each control point comprises calculating a new characteristic curve value by using the following Equation 1.

$$Pos_{crv}[k] = \min(\max(A, B), \max(Pos_{crv/old}[k], Pos_{dc}[k])) \quad \text{(Equation 1)}$$

$$A = \min(Pos_{crv/old}[k], Pos_{dc}[k])$$

$$B = Pos_{crv/old}[k] + Wgt_{ftr/step}[k] \times Pos_{ftr/step}$$

$$Wgt_{ftr/step}[k] = \Delta Pos_{ftr}[k] \div \Delta Pos_{ftr/max}$$

where, $Pos_{crv}[k]$ is a new characteristic curve value of the k-th control point, $Pos_{crv/old}[k]$ is a characteristic curve value of the k-th control point, $Pos_{dc}[k]$ is a convergence value of the k-th control point, $Pos_{ftr/step}$ represents a step size, $\Delta Pos_{ftr}[k]$ is a change value of the k-th control point, and $\Delta Pos_{ftr/max}$ is a change value of the control point in which a difference value between the convergence value and the characteristic curve value is the maximum value.

3. The method for adjusting the clutch characteristic curve of claim 1, wherein
    the determining the new characteristic curve for each control point further comprises
    determining a convergence value for each control point as a new characteristic curve value when the maximum value of the calculated difference values does not exceed the preset reference value.

4. The method for adjusting the clutch characteristic curve of claim 1, further comprising
    after the determining the new characteristic curve for each control point,
    updating the clutch characteristic curve based on the new characteristic curve value of each control point.

* * * * *